(12) United States Patent
Talon et al.

(10) Patent No.: US 8,978,542 B2
(45) Date of Patent: Mar. 17, 2015

(54) MODULAR SYSTEM WITH SMALL FOOTPRINT AUTONOMOUS MODULE

(75) Inventors: Christian Talon, Vufflens-le-Chateau (CH); Jean-Luc Denisart, Cully (CH)

(73) Assignee: Nestec S.A., Vevey (CH)

( * ) Notice: Subject to any disclaimer, the term of this patent is extended or adjusted under 35 U.S.C. 154(b) by 886 days.

(21) Appl. No.: 13/144,209

(22) PCT Filed: Jan. 12, 2010

(86) PCT No.: PCT/EP2010/050244
§ 371 (c)(1),
(2), (4) Date: Jul. 12, 2011

(87) PCT Pub. No.: WO2010/081791
PCT Pub. Date: Jul. 22, 2010

(65) Prior Publication Data
US 2011/0265658 A1 Nov. 3, 2011

(30) Foreign Application Priority Data
Jan. 14, 2009 (EP) ..................................... 09150556

(51) Int. Cl.
*A47J 31/00* (2006.01)
*A47J 31/44* (2006.01)
(Continued)

(52) U.S. Cl.
CPC ............ *A47J 31/4403* (2013.01); *A47J 31/005* (2013.01); *A47J 2201/00* (2013.01)
USPC ............... 99/289 R; 99/279; 99/295; 99/301; 99/318

(58) Field of Classification Search
CPC ... A47J 31/4403; A47J 31/4428; A47J 31/54; A47J 31/24; A47J 31/44; A47J 31/4414; A47J 2201/00; A47J 31/005

USPC .......... 99/289, 295, 300, 301, 306, 313, 314, 99/315, 316, 318, 319, 320, 322, 323, 99/289 R, 289 D, 294
See application file for complete search history.

(56) References Cited

U.S. PATENT DOCUMENTS 3,186,137 A * 6/1965 Eitzen .............................. 53/411
3,293,042 A * 12/1966 Eitzen .............................. 426/77
(Continued)

FOREIGN PATENT DOCUMENTS

| EP | 1 864 598 | 12/2007 |
|---|---|---|
| EP | 2387341 | 11/2011 |

(Continued)

*Primary Examiner* — Dana Ross
*Assistant Examiner* — Gyounghyun Bae
(74) *Attorney, Agent, or Firm* — K&L Gates LLP

(57) ABSTRACT

The present invention proposes a system for producing a beverage from portioned ingredients provided within a capsule or pod, the system comprising a base station (1) comprising a (e.g. removable) water reservoir of large capacity (12), an autonomous beverage preparation module (2) comprising an extraction head (4) and being removably connectable to the base station (1) from an autonomous-use mode to docked-use mode, wherein the autonomous module (2) comprises a water inlet connection means (27, 27a), wherein the autonomous module (2) and the base station (1) respectively comprise matching positioning means (5a, 5b) which engage when the beverage preparation module (2) is connected to the base station (1) in the docked position, and wherein it comprises alternative water supply means (11, 29, 36) and water outlet connection means (28, 32, 36a) adapted for connecting to the water inlet connection means (27) of the module (2) for supplying water to the module when the module is in the autonomous-use mode.

6 Claims, 10 Drawing Sheets

(51) Int. Cl.
   *A47J 31/06* (2006.01)
   *A47J 31/20* (2006.01)

(56) References Cited

U.S. PATENT DOCUMENTS

| | | | | |
|---|---|---|---|---|
| 4,138,936 A * | 2/1979 | Williams | | 99/282 |
| 4,147,097 A * | 4/1979 | Gregg | | 99/283 |
| 4,300,442 A * | 11/1981 | Martin | | 99/289 R |
| 7,017,472 B2 * | 3/2006 | Grant et al. | | 99/282 |
| 7,231,869 B2 * | 6/2007 | Halliday et al. | | 99/289 R |
| 7,469,628 B2 * | 12/2008 | Mandralis et al. | | 99/295 |
| 2006/0090653 A1 * | 5/2006 | McDuffie et al. | | 99/279 |
| 2007/0034086 A1 * | 2/2007 | Colman et al. | | 99/279 |
| 2007/0175334 A1 * | 8/2007 | Halliday et al. | | 99/279 |
| 2007/0175338 A1 * | 8/2007 | Glucksman et al. | | 99/279 |
| 2007/0266861 A1 * | 11/2007 | Hart | | 99/279 |
| 2008/0000357 A1 * | 1/2008 | Yang et al. | | 99/279 |
| 2008/0028944 A1 * | 2/2008 | Webster et al. | | 99/283 |
| 2008/0041231 A1 * | 2/2008 | Beharry et al. | | 99/279 |
| 2008/0121112 A1 * | 5/2008 | Dworzak et al. | | 99/323.1 |
| 2008/0178741 A1 | 7/2008 | DeMars et al. | | |
| 2011/0265658 A1 * | 11/2011 | Talon et al. | | 99/289 R |

FOREIGN PATENT DOCUMENTS

WO    0172189    10/2001
WO    2007017849    2/2007

* cited by examiner

MODULAR SYSTEM WITH SMALL FOOTPRINT AUTONOMOUS MODULE

FIELD OF THE INVENTION

The present invention relates to a modular system for producing a beverage from portioned ingredients contained within a capsule or pod. In particular, the present invention relates to such a modular system comprising an autonomous beverage preparation module and a base station designed to interact with each other.

BACKGROUND OF THE INVENTION

It is known from the prior art to provide a modular beverage production system consisting of a docking station and a beverage preparation module. Thereby, the docking station and the beverage preparation module are designed to be selectively in a connected state and a disconnected state.

WO 2007/141334 proposes a beverage preparation module which can be selectively connected to a docking station. The docking station and module are respectively provided with a control circuitry, the control circuitry of the module being designed for an autonomous control of the module in the disconnected state, and the control circuitry of the docking station being designed to take over at least partially the control of the module in the connected state.

FR2544185 relates to a series of modular elements in order to make up espresso coffee machines. The problem solved consists in fulfilling the requirements and in simplifying the manufacture of the machines. The series is characterised in that it comprises a modular element for heating the water equipped with a heater and modular dispensing elements equipped with a spout and with two spouts, it being possible to juxtapose these elements.

OBJECT AND SUMMARY OF THE INVENTION

Based on the known prior art, the present invention seeks to reduce the footprint, improve the portability and autonomy of a first beverage module with respect to a base station to which the beverage module can be selectively connected.

In particular, the invention seeks to provide a very compact module having a minimized footprint and thus enhanced storage properties while at the same time, the modularity of the system is increased compared to the prior art.

Furthermore, the invention seeks to provide a higher degree of service, improved handling properties and thus, an enhanced usability to an operator of the device.

The present invention also aims at other objects and particularly the solution to other problems as will appear in the rest of the present description.

The above outlined objects are especially achieved, according to a first aspect of the present invention, by a system for producing a beverage from portioned ingredients provided within a capsule or pod, the system comprising a base station comprising a (e.g. removable) water reservoir of large capacity, an autonomous beverage preparation module comprising an extraction head and being removably connectable to the base station from an autonomous-use mode to docked-use mode, wherein the autonomous module comprises a water inlet connection means, wherein the autonomous module and the base station respectively comprise matching positioning means which engage when the beverage preparation module is connected to the base station in the docked position, and wherein it comprises alternative water supply means and water outlet connection means adapted for connecting to the water inlet connection means of the module for supplying water to the module when the module is in the autonomous-use mode.

The positioning means are preferably designed to position the beverage preparation module on the base station such that a drip tray of the base station is positioned vertically below a liquid outlet of the module.

The alternative water supply means preferably comprises a liquid reservoir connectable to the module and having a water capacity smaller than the water reservoir of the base station, e.g., the liquid reservoir having a water capacity between 50 and 250 ml.

Moreover, the alternative water supply means may as well comprise a flexible water drawing tube and a water outlet connection means removably connectable or permanently connected to the inlet connection means; said tube being unfoldable for assuring a temporary fluid connection of the module to an external water supply source (e.g., water bottle or glass). Accordingly, the autonomous module does not have to comprise an integrally formed liquid reservoir and thus, the portability of the module can be increased.

The water drawing tube may comprise filter means for preventing suction of undesired particles and hence clogging of the connection means.

In the docked state of the module and the base station, a fluid connection between the base station and the module is preferably established. Thereby, dedicated liquid connection means of the base station are preferably connected to the water inlet connection means of the module. Alternatively, additional water inlet connection means may be provided at the module, which are designed to engage with the liquid connection means of the base station in the docked state. Accordingly, in the docked state, liquid is provided from the large-capacity liquid reservoir of the base station to the module.

The beverage preparation module may further comprise electrical connection means in order to be electrically connected to the base station. Said electrical connection means may be a cordless electrical connection. However, the beverage preparation module preferably comprises power supply means additional to said electrical connection means. Accordingly, the autonomous functioning of the beverage preparation module when being disconnected from the base station is enabled.

In another aspect of the invention, the small-capacity reservoir of module and the reservoir of the base station are connectable to a three-way valve designed to take at least two positions for selectively supplying water to the functional block (i.e., pump, heater, extraction head, ... ) depending on the mode at which the system is configured in, e.g., docked or autonomous modes. In particular, in a first position corresponding to the docked mode, the three way valve is respectively configured to selectively allow the water supply from the large-capacity reservoir of the base station and, in a second position corresponding to the autonomous mode, to selectively allow the supply from the small capacity reservoir of the module. The three-way valve is preferably actuated automatically in the suitable supply positions by the engagement/disengagement of the liquid connection means of the base station into the water inlet means of the module. It should be noted that the term "three-way valve" should not be viewed as limited to any specific structure of valve but rather encompasses all kinds of valve means providing the selective supply positions as defined.

In a preferred embodiment, the beverage preparation module further comprises a cup support selectively connectable to the module only when the module is disengaged from the base station in the autonomous mode. Thereby, the cup support can be a separate pad, e.g., a rubber pad, or a support which is swivelled at the module and can take a retracted position when the module is fitted in the base station in the docked position.

Moreover, the extraction head of the module is preferably designed to be selectively brought into contact with or at least into the vicinity of the cup support by means of a rotation about a horizontal axis of a body of the beverage preparation module. Accordingly, the beverage preparation module can be brought into a very compact arrangement by rotating the extraction head about said horizontal axis and thus, bringing the extraction head to abut on the cup support.

In a second aspect, the invention relates to a system for producing a beverage from portioned ingredients provided within a sealed capsule or pod, the system comprising a base station comprising a drip tray, an autonomous beverage preparation module comprising an extraction head having a liquid outlet and being removably connectable to the base station, wherein the autonomous module and the base station respectively comprise matching positioning means which engage when the beverage preparation module is connected to the base station, and wherein the positioning means are designed to position the beverage preparation module on the base station such that the drip tray of the base station is positioned vertically below the liquid outlet of the module.

The base station and the beverage preparation module are adapted to be selectively in a connected or docked state and a disconnected state. The connection and disconnection can e.g. be carried out by a manual user operation.

In a preferred embodiment, the extraction head having the liquid outlet is rotatably arranged with respect to a horizontal axis of a body of the autonomous module. Accordingly, the position of the liquid outlet with respect to the drip tray or a cup support connectable to the module can be modified.

Moreover, the vertical position of the drip tray of the base station is preferably designed to be selectively adjusted.

Accordingly, it is possible to vary the distance between the liquid outlet of the extraction head and the exact position of the liquid outlet with respect to the drip tray of the base station in the connected state of the module and the base station. Therefore, receptacles of different forms and sizes can be placed beneath the liquid outlet in order to receive liquid provided by the beverage preparation module respectively the outlet thereof. A user may therefore easily adapt the module and the base station to place an espresso, a lungo or a caffé latte receptacle beneath the liquid outlet of the module.

The positioning means for connecting the beverage preparation module and the base station preferably comprise matching surfaces and/or profiled sections of the beverage preparation module and the base station. The matching surfaces and/or profiled sections of the module and the base station enable a preferably single easy-to-fit position and a stable support of the beverage preparation module at the base station in their connected state.

As already described, the beverage preparation module may comprise a cup support selectively connectable to a base portion of the module. Preferably, the cup support is connectable to the beverage preparation module by means of positioning means. In a preferred embodiment, at least a part of the positioning means for connecting the module to the base station also serves to connect the module and the cup support of the base station. Therefore, the cup support is preferably only connectable to the module when the module is not connected to the base station. Accordingly, a very integrated and compact arrangement of the system can be provided.

The autonomous beverage preparation module is provided with means for producing a beverage from ingredients contained in a capsule. Accordingly, the autonomous beverage preparation module preferably comprises a functional block including a water pump and water heating means. Moreover, the functional block preferably comprises an extraction chamber housed in the extraction head of the module. Thereby, the extraction chamber is designed for housing an ingredient containing capsule and for being supplied with heated pressurised liquid from the water pump and the water heating means. The water pump and the heating means are preferably connected to a liquid reservoir of the module.

The capsule may be directly provided to the extraction chamber of the module by an operator. Moreover, additional means such as a capsule-holder may be connected to the extraction head of the module in order to provide a capsule to the extraction chamber thereof.

With the module according to the present invention, it is possible to enable an interaction between liquid supplied by the liquid reservoir and the pump of the module and ingredients contained in a capsule provided to the extraction chamber. The internal pressure within the sealed capsule which is built up due to the liquid supply to the capsule causes a lower face of the capsule to open which enables the output of the beverage to be prepared. Thereby, the injection of the liquid provided by the module takes place at an upper face of the capsule which is for example pierced by a dedicated injection member of the module. As already described, the output of the beverage to be prepared takes place at the lower face of the capsule thus, enabling a direct flow of the liquid. Accordingly, a receptacle such as a cup can be placed beneath the capsule in order to receive the beverage to be prepared.

WO 03059778 relates to such a capsule which is preferably used for beverage preparation with the present module. The capsule contains one or more ingredients. After the injection of liquid into the capsule, the pouring from the capsule may be delayed in order to provide sufficient time for the interaction of the liquid and the ingredients contained within the capsule. For the pouring of the beverage to be prepared from the capsule, opening means such as reliefs against an outlet membrane which open a lower wall of the capsule may be provided. These opening means interact with the pressure rise within the capsule when the liquid is injected. The capsule has amongst others the advantage that beverages can be prepared without "cross-contamination" i.e. that a first beverage to be prepared does not transmit one or more undesired characteristics such as taste, colour and/or odour to a second beverage distributed after the first. The present invention may as well apply to any other food or beverage cartridge, pod or sachet containing ingredient(s) brewed, dissolved or diluted in a beverage device according to any other principle than WO 03059778.

In the context of the invention, the term "capsule" is used to encompass any type of suitable packages containing food ingredients adapted to be inserted in an extraction/brewing chamber of the extraction head of the beverage preparation module such as a sealed aluminium or plastic capsule and/or a filter pod, a pouch, a cartridge or a sachet using these other brewing principles.

The rotatable arrangement of the extraction head of the beverage preparation module may enable the provision of several operational modes of the module. Accordingly, a predefined angular displacement or position of the rotatable extraction head with respect to the body of the module may correspond to a predefined operational mode or status of the module. For example, the extraction head being rotatably moved in order to be in vicinity of the base portion of the module may correspond to a sleep mode of the module. Accordingly, the provision of electric power to the functional block or some parts of the functional block of the beverage preparation module such as the heating means may be interrupted if the extraction head is brought into the dedicated sleep mode position.

Moreover, on its connected respectively docked state, the extraction head may be rotated such as to be in vicinity of the drip tray of the base station connected to the beverage preparation module in order to bring the module into the sleep mode. Accordingly, it is possible to obtain a very compact arrangement of the beverage preparation module in the sleep mode and thus, enhance the storage properties of the module since the required space of the module is decreased in the storage position.

To bring the module from said sleep or storage mode to an on-mode, the operator has to rotate the extraction head with respect to the body of the module upwardly, i.e. away from the drip tray of the base station respectively a cup support connected to the module. Hence, in said on-mode, power is supplied to the module and in particular to the functional block of the module in order to enable the preparation of beverages with the module.

The liquid reservoir of the beverage preparation module is preferably a low-capacity reservoir of a preferred volume between 50 and 250 ml. Thereby, the liquid reservoir can be selectively connected to the beverage preparation module and preferably to a base portion of the beverage preparation module or a recess formed at the body of the module.

Accordingly, a smaller footprint of the machine can be achieved and also a lighter and more portable but autonomous beverage preparation module can be provided. Due to the enhanced portability of the beverage preparation module, an operator may easily carry the module to any desired place at which he intends to prepare a beverage, totally independent of the base station. Moreover, further recesses may be provided at the body of the module in order to provide a storage position for the liquid reservoir in a non-operational mode of the module and hence, in order to minimize the required space of the module.

The beverage preparation module is provided with electric supply means. The base station can be free of electric supply means or be provided with electric supply means. The base station may receive its electrical power supply from the beverage module, in which case, the positioning means further comprise matching electrical connections for the base station to be supplied in electrical power from the beverage preparation module.

Moreover, the system according to the present invention preferably further comprises liquid connecting means for establishing a liquid connection between the beverage preparation module and the base station.

Thereby, the beverage preparation module preferably comprises an electronic control circuitry which is designed for an autonomous control of the operation of the beverage preparation module when the module is not connected with the base station.

The base station can be designed to offer to the beverage preparation module at least one or more of advanced electronic control resources, fluid resources, electrical power resources, user interfacing resources (control buttons, displays, . . . ) etc. . . .

The base station may carry additional electrical devices such as for example a MP3/MP4-Player, a USB-port or a radio.

In a preferred embodiment, the base station comprises at least an additional liquid reservoir which is essentially larger than the low-capacity liquid reservoir of the beverage preparation module. The volume of the additional large-capacity reservoir is preferably between 500 to 1000 ml. Thereby, the base station can be provided with means for supplying essentially unpressurised liquid to the pump of the beverage preparation module.

The liquid connecting means of the system may comprise an extension conduit designed to enable a connection between the beverage preparation module and an external liquid reservoir. Accordingly, the beverage preparation module may also be supplied with liquid from an external liquid supply, such as e.g. water provided in a glass or bottle, in case the beverage preparation module is not connected to the base station and the dedicated liquid reservoir of the beverage preparation module is not connected thereto.

In another aspect, the present invention relates to a modular system for producing a beverage from portioned ingredients provided within a capsule or pod, the system comprising a base station comprising a water reservoir, an autonomous beverage preparation module comprising an extraction head and being removably connectable to the base station from an autonomous-use mode to docked-use mode, at least one base station comprising at least one functional accessory providing additional functions to the module. This functional accessory may be integrated to the base station or be separable from the base station.

In a preferred embodiment, the modular system comprises a selection of at least two base stations comprising at least one different functional accessory associated to each one.

Thereby, the least one functional accessory is a digital data communication terminal (USB, internet, ethernet, wifi, bluetooth) and/or media player (TV screen , radio, MP3, MP4, etc.), a low-voltage charging terminal for mobile devices (e.g., cell-phone or digital media player) and combinations thereof.

Moreover, the at least one functional accessory may as well be a cup heater, a water chilling device, a milk frother, a sweetener (e.g., sugar) dispenser, spoon dispenser and combinations thereof.

In a further aspect, the invention relates to a beverage device of small footprint comprising a body having a recess for receiving a small-capacity reservoir in a storage mode, said reservoir being displaceable from its storage mode into a water connection mode to a water inlet of the body; said device having a smaller footprint in the storage mode than in the water connection mode.

In a preferred embodiment, a removeable or unfoldable water connector may be connected to the module in order to establish a fluid connection between water inlet and a small-capacity liquid reservoir in the water connection mode. Accordingly, the connector may be unfolded from a retracted position in the machine to an expanded position such as by sliding means, a swivel etc.

The advantage of this embodiment is a very compact machine in the storage mode while still providing a reserve of water for about two cups by means of the liquid reservoir in the water connection mode.

BRIEF DESCRIPTION OF THE DRAWINGS

Further features, advantages and objects of the present invention will become apparent for the skilled person when reading the following detailed description of embodiments of the present invention, when taken in conjunction with the figures of the enclosed drawings.

DETAILED DESCRIPTION OF THE FIGURES

Figure 1:
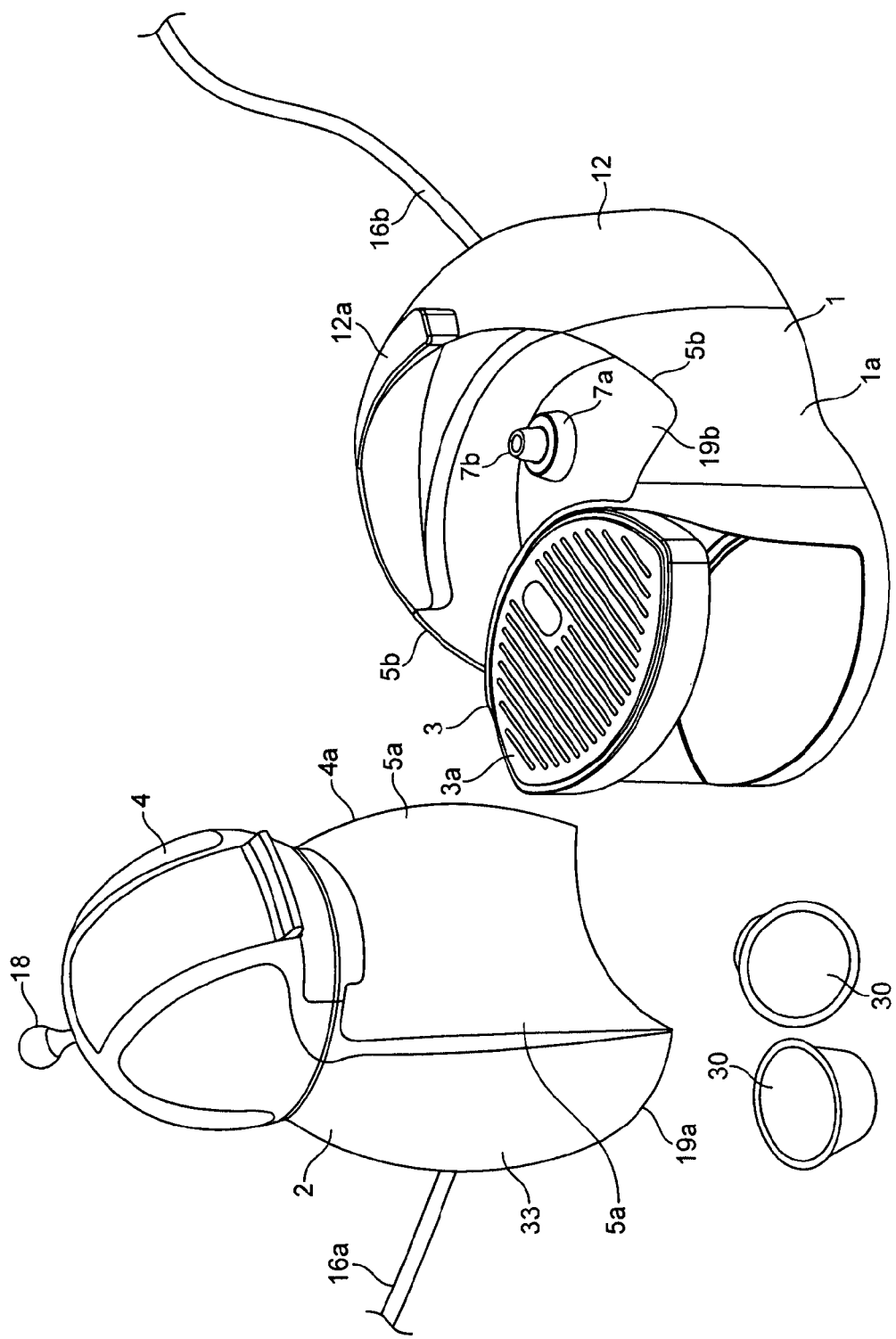
FIG. 1 shows a perspective side view of a preferred embodiment of a system according to the present invention, the system comprising a beverage preparation module and a base station, whereby the beverage preparation module is not connected to the base station.

FIG. 1 shows a system according to the present invention in perspective side view. According to the invention, the system comprises a beverage preparation module 2 and a base station 1 which can be connected to each other.

The beverage preparation module 2 is preferably an autonomous module comprising a functional block (cf. FIG. 4) comprising a pump 10a, heating means 10b and a control unit 10c connected to at least the pump 10a and the heating means 10b of the module 2.

In a preferred embodiment, the module 2 preferably comprises a small liquid reservoir (reference 29 in FIG. 2a-2c and 11 in FIG. 4), selectively connectable to the module 2. At least the pump 10a and the heating means 10b of the functional block of the module 2 are in fluid connection to the liquid reservoir and an extraction chamber (not shown) within the extraction head 4 of the module 2. A human operator may insert a capsule 30 (FIG. 1) to the extraction head 4 respectively to the extraction chamber of the extraction head 4. Thereby, the capsule 30 may be inserted to the extraction chamber by means of an aperture provided at the extraction head 4 or by means of a capsule-holder for housing the capsule which can be selectively connected to an aperture at the extraction head 4. According to this embodiment, heated pressurized liquid can be provided to the extraction chamber and thus to the capsule 30 housed therein.

The extraction head 4 preferably comprises a control lever 18 which can be used for selecting cold or hot water to be injected into the capsule 30 when being inserted into the extraction head 4. Thereby, the control lever 18 preferably comprises three positions, a neutral, a hot water and a unheated water position. Accordingly, when the lever is held in the neutral position, no water is supplied to the extraction head 4 and hence to the capsule 30 housed within the extraction head 4. If a user changes the lever position from neutral to the hot or unheated water position, hot or respectively unheated water is injected to the capsule 30 within the extraction head 4 until the position of the lever is changed back to neutral. Thereby, the unheated or hot water injected into the capsule 30 is made to interact with ingredients provided within the capsule 30 in order to form a cold or hot beverage which is then poured from a liquid outlet 4a at the extraction head 4. It should be understood that the liquid outlet 4a may as well be formed by a lower face of the capsule 30 being provided to the extraction head 4, thereby enabling a direct flow of liquid through the capsule 30.

The beverage preparation module 2 comprises a lower stand portion 19a, preferably flat, which enables a stable positioning of the module 2.

At a rear portion of the beverage preparation module 2, electrical connection means 16a, such as an electrical cable and plug, may be arranged which enable the connection of the module 2 to the mains supply. Accordingly, the supply of electricity to the module 2 at least during the autonomous usage, i.e. when the module 2 is not connected to the base station 1, can be ensured.

The base station 1 of the system preferably comprises a body portion 1a to which a drip tray 3 can be connected. The vertical position of the drip tray 3 is preferably adjustable. Hence, receptacles of different heights can be placed onto the drip tray in order to receive beverage dispensed from the liquid outlet 4a of the beverage preparation module 2 without creating too much splashing.

The base station 1 is preferably designed to offer to the beverage preparation module 2 at least one or more of advanced electronic control resources, fluid resources, electrical power resources, user interfacing means etc.

As shown in FIG. 1, the base station 1 comprises a liquid reservoir 12 which is removably connectable to the body 1a of the base station 1. Thereby, the liquid reservoir 12 is essentially of larger capacity than the liquid reservoir (reservoir 29 in FIG. 2a-2c) which is connectable directly to the beverage preparation module 2. Therefore, in the docked state of the module to the base station, the liquid supply is designed to provide a sufficient capacity which corresponds to a typical sedentary usage of the beverage preparation machine.

The liquid reservoir 12 of the base station 1 preferably comprises a handle 12a in order to enable a facilitated handling of the liquid reservoir 12 by an operator. The liquid reservoir 12 preferably also comprises a filling aperture covered by a lid (not shown) in order to enable a refilling of the reservoir 12.

The base station 1 further may comprise electrical supply means 16b which are preferably arranged at a rear portion of the base station 1. Said electrical supply means 16b is preferably a cable and plug for connecting the base station 1 to the mains supply. In addition, an on/off button 21 is preferably arranged at the module 2 (cf. FIG. 3) in order to enable the user of the module 2 to switch between the on- and off-state of the module 2. Thereby, feedback means such as an LED for example may be arranged at the module 2 in order to indicate, whether the module 2 is in its on or off-state.

The base station 1 further comprises a recess 19b which is preferably formed at the body portion 1a of the base station 1 and which is preferably encompassed by positioning means 5b. Said position means 5b are preferably profiled, protruding and/or recessed elements of the body portion 1a of the base station 1. Said positioning means 5b are designed to interact with correspondingly formed positioning means 5a provided at the beverage preparation module 2. Thereby, the positioning means 5a of the module 2 and the positioning means 5b of the base station 1 may be any means, such as complementary shaped protruding and recess surfaces, suitable for enabling a stable arrangement of the module 2 when being connected to the base station 1.

The recess 19b of the base station 1 is preferably designed to abut on the stand portion 19a of the beverage preparation module 2 when being connected to the base station 1.

Within the recess 19b, additional positioning means 7a are preferably arranged which may be any recessed and/or protruding surfaces which are designed to enable a correct positioning of the beverage preparation module 2 when being connected to the base station 1.

Moreover, a connection means 7b are preferably arranged within recess 19b of the base station 1. Said connection means 7b are preferably designed to enable a fluid connection between the module 2 and the base station 1. Accordingly, a fluid supply from the base station 1 to the module 2 is enabled during the connected state of the module 2 and the base station 1.

Electrical connection means may also be provided in the recess 19b which cooperates in engagement with complementary electrical means placed at the lower stand 19a of the module. Preferably, the electrical connection means and liquid connection means are separate and spaced apart on each of the surfaces of the base station and module so that the electrical connection means are as less as possible contaminated with residual liquid.

In a simplified embodiment, the base station is free from electrical supply means (i.e., no cable 16b provided) and only the module is supplied in electrical power by means 16a. In this case, the base station only ensures the liquid supply function (i.e., by reservoir 12) and the liquid residual collecting function (i.e., by drip tray 3). In such embodiment, the surface 19a is preferably provided with a passage (not shown) for enabling the electrical supply means 16a to traverse the base station and be directed to the rear or side of the station for connection to the supply mains.

Figure 2A:
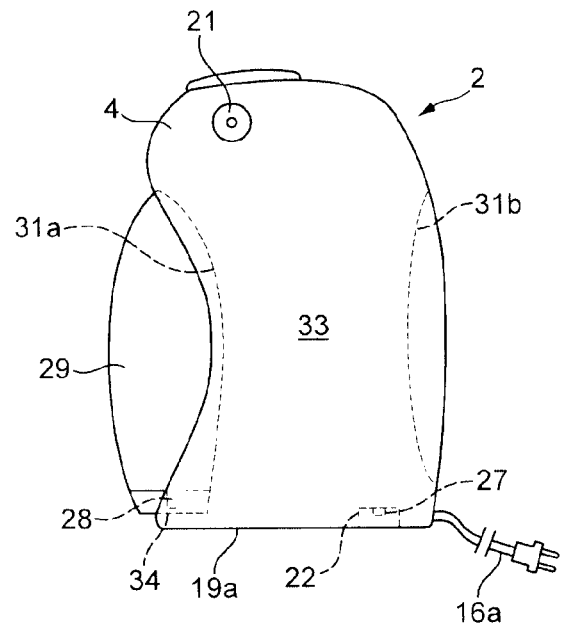
FIG. 2a shows a schematic drawing of the embodiment of the beverage preparation module according to FIG. 1, wherein the module is shown in storage mode.
Figure 2C:
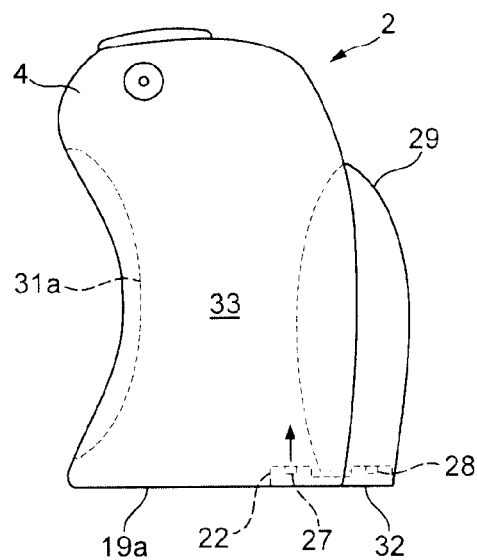
FIG. 2c shows a schematic drawing of the embodiment of the beverage preparation module according to FIG. 1, wherein the module is shown in fluid connection mode.
Figure 2B:
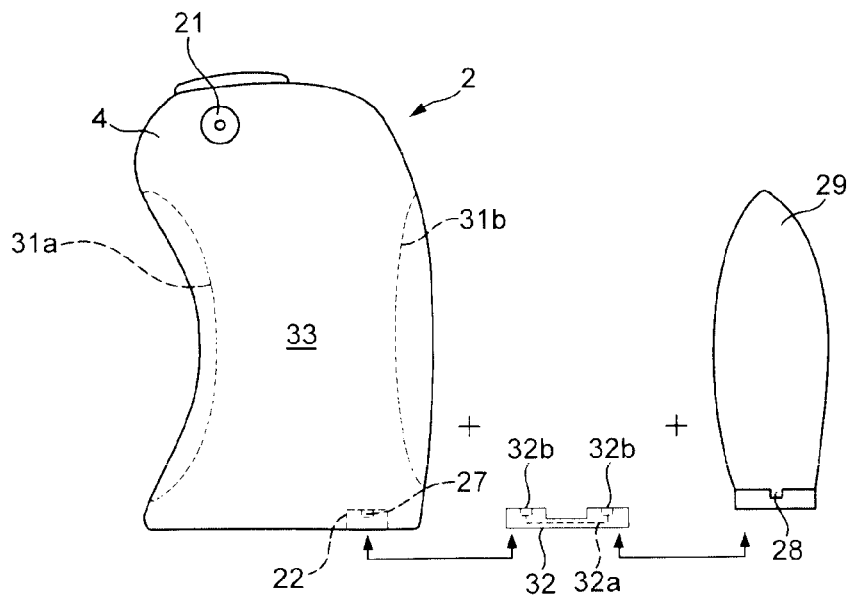
FIG. 2b shows a schematic drawing of the embodiment of the beverage preparation module according to FIG. 1, wherein the module is connected to a liquid reservoir by means of a connector.

FIGS. 2a to 2c refer to schematic drawings of the embodiment of the beverage preparation module 2 according to FIG. 1. As shown in the figures, the beverage preparation module 2 has a storage mode (FIG. 2a) and a fluid connection mode (FIG. 2c).

The body 33 of the module 2 preferably comprises a storage recess 31a which is designed for housing the liquid reservoir 29 in the storage mode. The storage recess 31a is preferably situated in the front portion of the body 33. Moreover, the storage recess 31a is preferably formed beneath the extraction head 4 of the module 2 and corresponds to the recess provided for placing a receptacle beneath the extraction head 4 in order to receive a beverage to be prepared by the module. In addition, the body 33 comprises a rear recess 31b which is formed at a rear portion of the body 33 and which is designed for housing the reservoir 29 in a fluid connection mode (cf. FIG. 2c).

The recesses 31a and 31b are preferably specifically designed to engage with matching surfaces of the liquid reservoir 29 to be connected to the module 2. Accordingly, the liquid reservoir 29 can be selectively connected to the front recess 31a and the rear recess 31b of the module 2.

The liquid reservoir 29 is preferably of small volume, preferably between 50 and 250 ml, most preferably of between 110 and 250 mL, for being able to deliver at least one large cup or two small cups of beverage.

Hence, the weight and overall measures of the autonomous module 2 can be minimized also in the use mode.

As shown in FIG. 2a, the liquid reservoir 29 is supported by support means 34 provided at the front recess 31a in order to enable a stable support of the liquid reservoir 29 when being connected to the front recess 31a.

In its storage mode, the arrangement of module 2 and liquid reservoir 29 is very compact and space saving. Accordingly, a very small footprint of the stand portion 19a of module 2 is obtained and thus, the storage properties of the module 2 are significantly enhanced. As a result, the footprint of the machine, i.e., the space surface occupied by the device, is lower in the storage mode of the reservoir (FIG. 2a) than in the liquid supply mode of the reservoir (FIG. 2c). For instance, the footprint of the machine can be 10 to 30% smaller in the storage mode than in the use mode.

As shown in FIG. 2b, an intermediate connector 32 may be provided which enables the connection of liquid reservoir 29 to the module 2. More specifically, the connector 32 is designed to enable a fluid connection between water inlet connection means 27 of the module 2 and water outlet connection means 28 of the liquid reservoir 29 by means of a tubular member 32a. For this reason, the connector 32 further comprises two connecting plugs 32b arranged at each end of the tubular member 32a to which the water inlet connection means 27 respectively the water outlet connection means 28 can be plugged. Thereby, the water outlet means 28 of the liquid reservoir 29 are preferably arranged at a lower portion of the reservoir 29.

It should be understood that the connector 32 can be a member separate to the module 2 and the liquid reservoir 29 as shown in FIG. 2b. For convenience, the connector may be, for instance, stored in a storage compartment or aperture of the base station. Hence, the connector 32 can be completely removed from the module 2 and the reservoir 29. However, the connector 32 may as well be an integral part of the module 2. Thereby, the connector may be unfoldable or retractable from the module 2. Accordingly, one of the two connecting plugs 32b of the connector 32 may be fixedly connected to the water inlet connection means 27 of the module 2.

Of course, the liquid reservoir 29 is provided with an aperture and a covering lid (not shown) at a top portion thereof, in order to enable a refilling of the liquid reservoir.

FIG. 2c refers to a fluid connection mode of the module 2 in which the reservoir 29 is stably connected to the rear recess 31b of the module 2. Thereby, the fluid connection between the reservoir 29 and the module 2 is established by means of the connector 32.

It should be understood that the water inlet connection means 27 are preferably housed within a recess 22 of the body 33 of the module 2. Moreover, the water inlet connection means 27 are connected to the functional block of the module 2, i.e. to the pump 10a and the heating means 10b. Hence, in the shown connected state, liquid can be drawn by the pump 10*b* of the module 2 from the liquid reservoir 29 to the module 2.

As the connector 32 extends the footprint of the stand portion 19*a* of module 2 to the rear, the footprint of the module in the fluid connection mode as shown in FIG. 2*c* is larger than in the storage mode according to FIG. 2*a*. Hence, in order to obtain a very compact and space-saving arrangement of the module 2, a user may bring the module 2 into its storage mode according to FIG. 2*a* in which the footprint of the module 2 is minimized.

Figure 3:
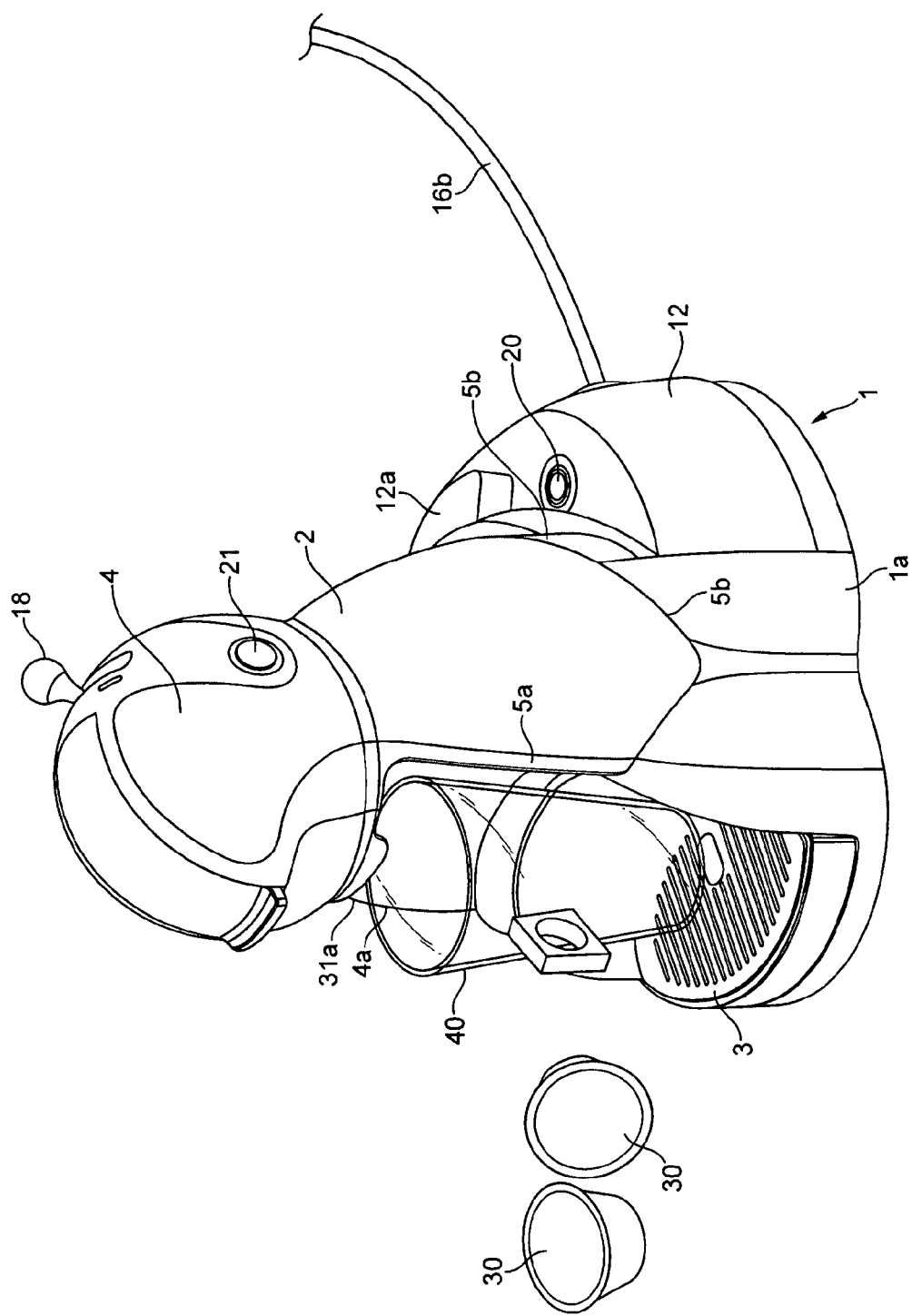
FIG. 3 shows a perspective side view of the beverage preparation module and the base station being in their connected state.

FIG. 3 refers to the connected or docked state of the beverage preparation module 2 and the base station 1 according to FIG. 1. Thereby, the stand portion 19*a* of the module 2 is placed within the receiving recess 19*b* of the base station 1. It should be noted that the liquid reservoir 29 according to FIGS. 2*a*-2*c* is not connected to the module 2 in the shown connection state.

When the module 2 is connected to the base station 1, the encompassing positioning means 5*b* enclose the positioning means 5*a* of the module 2 in order to enable a stable connection of the module 2 and the base station 1.

In addition, the protruding and/or profiled positioning means 7*a* (cf. FIG. 1) formed in the recess 19*b* are received by dedicated correspondingly shaped recessed and/or profiled positioning elements (e.g. recess 22, cf. FIG. 2*a*-2*c*) formed at the stand portion 19*a* of the module 2. Hence, the stable connection of the module 2 when being connected to the base station 1 can be further enhanced.

In the connected state of the module 2 and the base station 1, the connection means 7*b* of the base station 1 directly connect to the water inlet connection element 27 of the module 2 (cf. FIG. 2*a*-2*c*) in order to enable a fluid connection between the base station 1 and the module 2. Hence, water necessary for the beverage preparation by means of the module 2 can be drawn from the large liquid reservoir 12 of the base station 1 in the connected state. The liquid reservoir 12 of the base station preferably holds a volume of 500 to 1000 ml.

As already outlined, the recess 19*b* may as well comprise an additional connector suitable for establishing an electrical connection between the base station 1 and the module 2 in their connected state. Accordingly, the base station 1 may comprise electrical supply means 16*b* for connecting the base station 1 to the mains supply.

However, the base station 1 may as well not be provided with power supply means. Furthermore, an additional passage such as an aperture or hole in recess 19*b* and a lower groove in a base portion of the base station 1 connected to the hole or aperture may be provided through which the electric cable 16*a* of the module 2 can be passed when the module 2 is connected to base station 1.

Preferably, the liquid reservoir 12 is detachably arranged with respect to body 1*a* of the base station 1. Accordingly, a connection valve 20 is arranged at the body 1*a* in order to enable a fluid connection between the liquid reservoir 12 and the base station 1. Thereby, a fluid conduit linking the valve 20 and the connection means 7*b* of the base station 1 enables the provision of liquid from reservoir 12 to module 2 in the shown connected state.

As can be seen in FIG. 3, a receptacle 40 such as a caffè latte glass can be placed at least partially into the front recess 31*a* of the module 2 and thus, beneath the extraction head 4. Thereby, the position of the receptacle 40 with respect to the extraction head 4 can be altered by means of the vertically adjustable drip tray 3. Accordingly, the spilling of liquid during the beverage preparation is effectively prevented.

For altering the vertical position of drip tray 3, several grooves may be formed at different heights in the front of the body 1*a* of the base station 1 into which correspondingly shaped tongues of the drip tray may engage. Accordingly, a stable key and slot joint is established between the drip tray 3 and the supporting body 1*a* of the base station 1.

Figure 4:
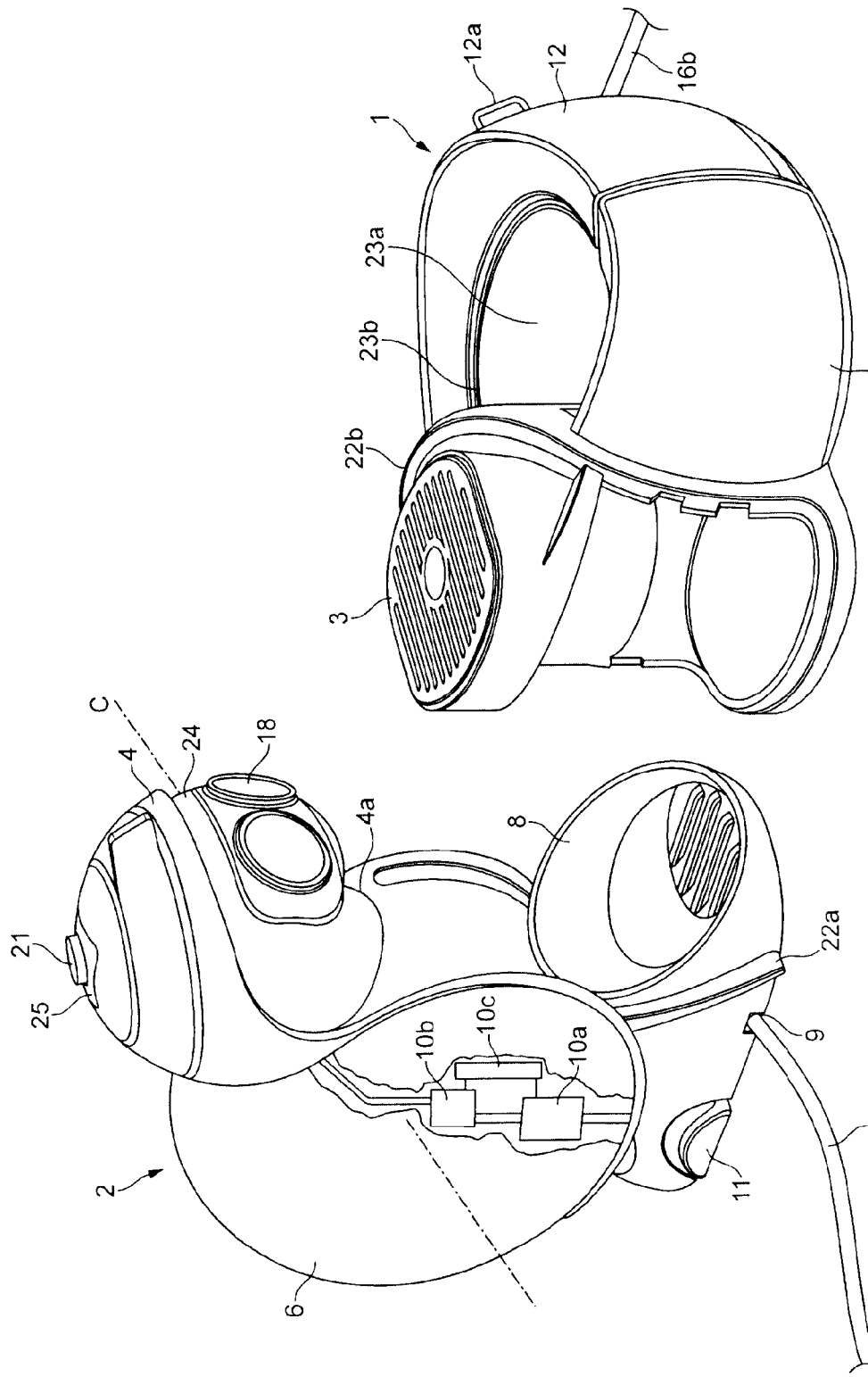
FIG. 4 shows another preferred embodiment of a system according to the present invention in perspective side view, the beverage preparation module and the base station being in their disconnected state.

FIG. 4 shows another embodiment of a system according to the present invention in perspective side view, the beverage preparation module 2 and the base station 1 being in their disconnected state.

As shown in the figure, a small liquid reservoir 11 is connectable to a base portion 9 of the module 2. Thereby, the volume of the liquid reservoir 9 is preferably between 50 a 250 ml. Moreover, the liquid reservoir 11 is preferably arranged such that the level of liquid within the reservoir 11 can be observed during usage of the module 2.

The module 2 according to the shown embodiment further comprises a cup support 8 which can be connected to base portion 9 of the module 2. The cup support preferably comprises a plurality of horizontal ridges protruding from a bottom portion of the cup support. Accordingly, spilled liquid is collected at the bottom portion of the cup support 8, whereby a receptacle 40 is supported by the ridges. Accordingly, the risk of liquid sticking to the receptacle bottom after the receptacle has been placed onto the cup support 8 is minimized.

Preferably, positioning means 22*a* are provided at the front of the base portion 9 to which the cup support 8 can be connected. The cup support 8 may be integral with the positioning means 22*a* or be a separable part.

The extraction head 4 of the module 2 comprises an aperture to which a capsule-holder 18 suitable for receiving a capsule 30 can be connected.

The base station 1 according to the shown embodiment of the system comprises a support area 23*a* which is provided at a top portion of the body 1*a* of the base station. Thereby, the support area 23*a* is enclosed by positioning means 23*b*. The positioning means 23*b* is preferably an upwardly protruding edge specifically designed for enclosing the base portion 9 of the module 2. Moreover, dedicated positioning means 22*b* are provided at a front portion of the base station 1 suitable for interacting with the positioning means 22*a* of the module 2. Accordingly, the positioning means 22*a* of the module 2 can be used for positioning respectively connecting both, the cup support 8 and the base station 1 to the module 2.

The module 2 preferably comprises information means 25 such as an LED or a display which enables a feedback whether the module 2 is switched on- or off. Preferably, the information means 25 are arranged in vicinity of the on/off-switch 21.

Figure 5:
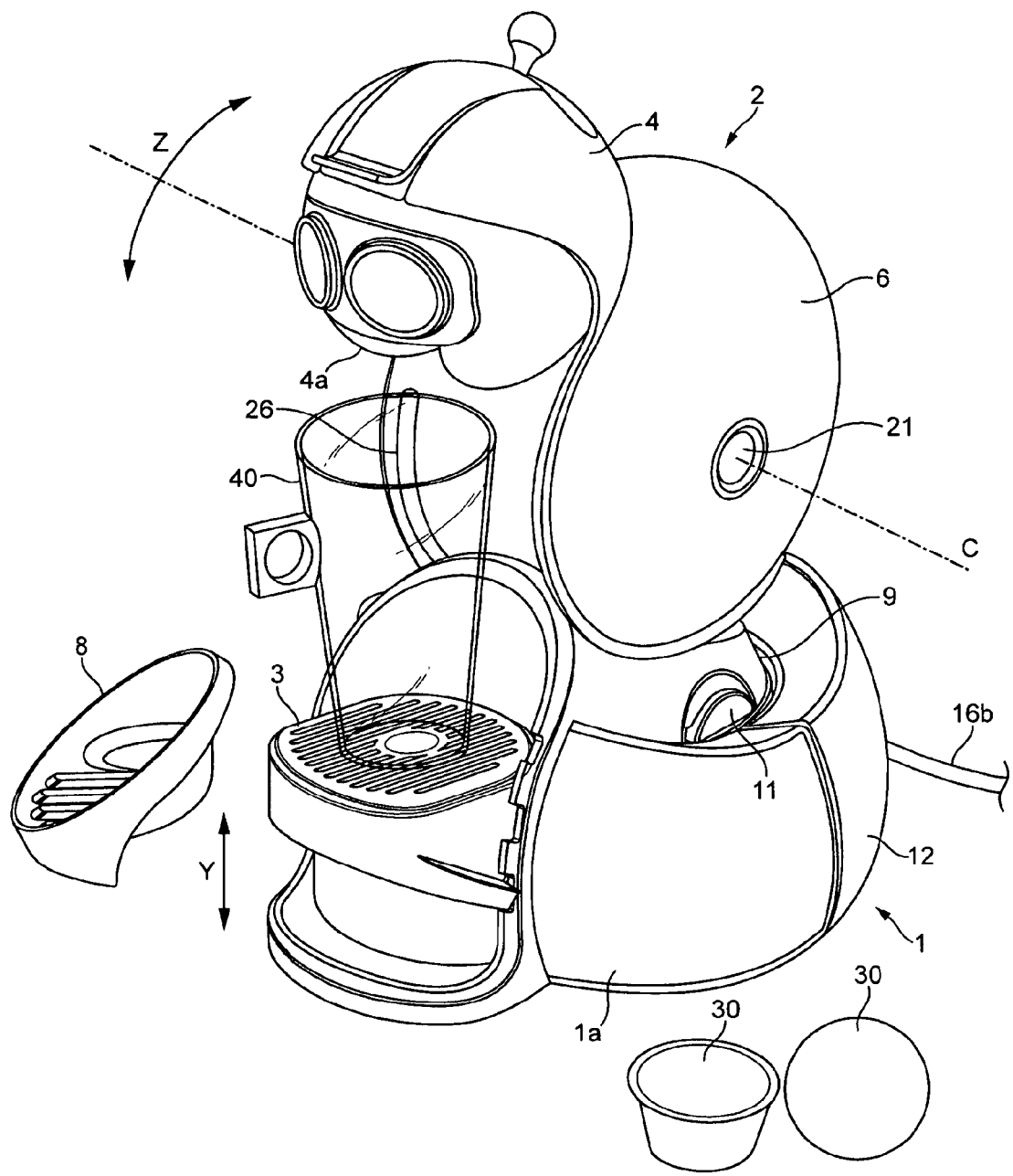
FIG. 5 shows a perspective side view of the system according to FIG. 4, whereby the beverage preparation module and the base station are in their connected state.

As shown in FIG. 5, the module 2 can be seated on the dedicated support area 23*a* of the base station 1. Thereby, a bottom face of the base portion 9 of the module 2 abuts on the support area 23*a*. In the connected state, the positioning means 22*a* of the module 2 engage with correspondingly-shaped positioning means 22*b* of the base station 1. Furthermore, dedicated positioning means 23*b* enclose base portion 9 of the module 2 in the connected state. At the rear of the base station 1 can be provided a larger capacity reservoir 12 for supplying the module 2 in the connected state.

Figure 6:
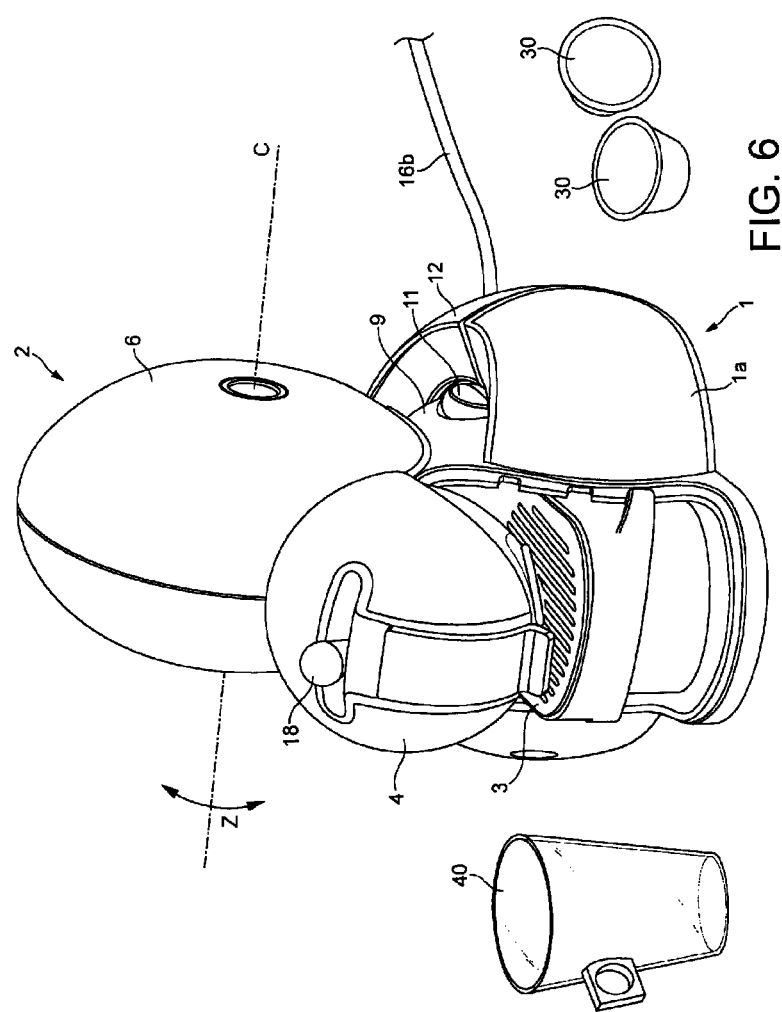
FIG. 6 shows a perspective side view of the system according to FIG. 5, whereby the beverage preparation module is rotated about a horizontal axis of the body of the module.

As shown in FIGS. 5 and 6, the extraction head 4 can be rotated about an axis C of the module 2 as indicated by arrow Z. Preferably, the whole body 6 and the extraction head 4 of module 2 can be rotated about axis C. For this purpose, the body 6 preferably comprises linear grooves 26 which are circumferentially provided at the body 6 and in which preferably T-shaped guiding tongues (not shown) are engaged which are connected to the base portion 9 of the module 2.

Hence, the guiding rails support and guide the body 6 and the extraction head 4 connected to body 6 of the module 2.

When being rotated about axis C, the extraction head 4 of the module 2 can be brought in vicinity of drip tray 3 respectively cup support 8 being connected to the module 2 (when the module 2 is not connected to the base station 1). This rotational position of the extraction head 4 corresponds to a sleep-mode or storage-mode of the module 2 in which the support of electric energy to at least the heating means 10*b* of the module 2 is disabled. Accordingly, energy can be saved during sleep-mode. Moreover, the required storing space of the module 2 can be minimized in the sleep-respectively storage-mode.

When rotating the extraction head 4 respectively the body 6 back to a position distanced from the drip tray 3 respectively the cup support 8, the module 2 is brought from its sleep- or storage-mode into its normal operating mode again and thus, support of electric energy to the heating means 10*b* is enabled. The sleep mode can correspond to a mode at which minimal electrical supply functions are assured or no electrical function is assured. For instance, the sleep mode can simply switch the heater off so to save electrical power during this mode. When the body is rotated back to the normal operating mode, the heater is automatically switched on without further interaction needed with the machine by the user.

In the shown embodiment, the vertical position of the drip tray 3 connected to the front of base station 1 can be adapted to a desired height as indicated by arrow Y in FIG. 5.

Figure 9:
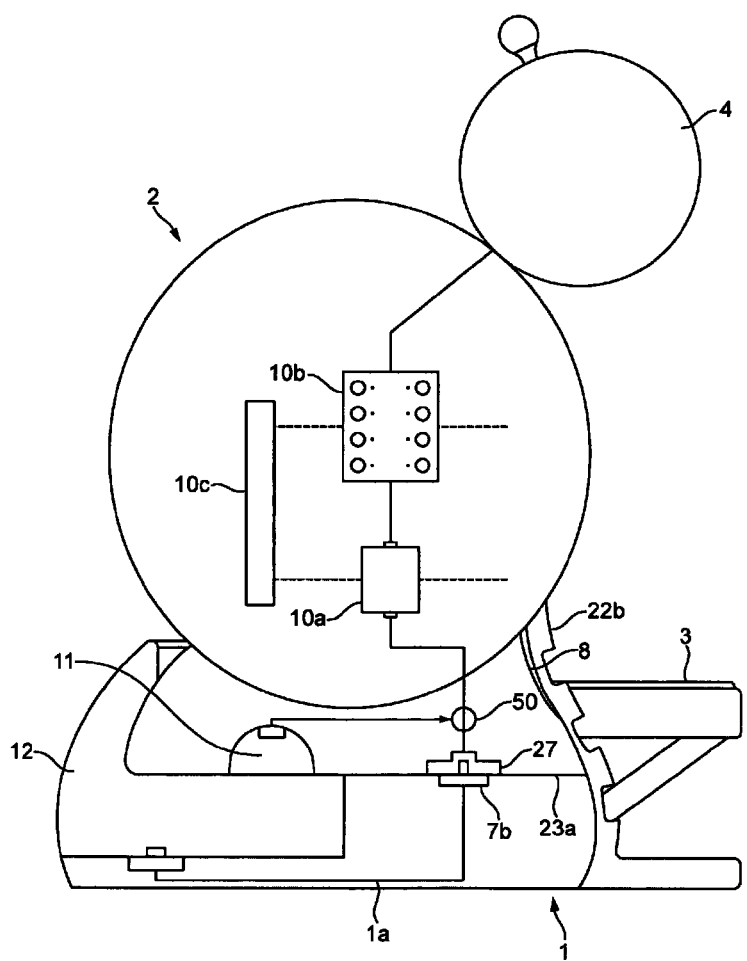
FIG. 9 shows a schematic representation of the system of FIG. 5 wherein the base station selectively supplies water to the module via a three-way valve means.
Figure 10:
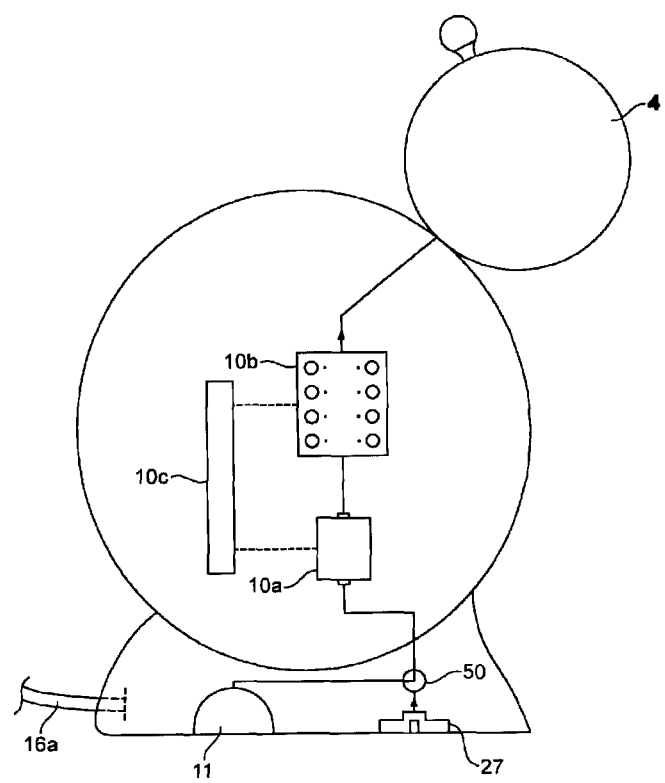
FIG. 10 shows the module of FIG. 9 in autonomous mode wherein the small-capacity water reservoir selectively supplies water to the fluid circuit of the module via the three-way valve means.

As shown in FIGS. 9 and 10, the module 2 preferably comprises a valve member 50 which is connected between the pump 10*a*, the small-capacity liquid reservoir 11 of the module 2 and the water inlet connection means 27 thereof. Preferably, said valve member 50 is a three-way-valve designed to selectively supply water from the small-capacity liquid reservoir 11 or an external liquid supply connected to the water inlet connection means 27 of the module 2.

When the module 2 is in its autonomous state as shown in FIG. 10, the three-way-valve 50 is designed to supply water from the small-capacity reservoir 11 of the module 2 to the pump 10*a* and hence to the flow circuit of the module 2. In this state, the valve shuts the line of the inlet connection means 27 so that there is no risk of dripping of water out from the base of the module.

In the docked state of the module 2 and the base station 1 as shown in FIG. 9, wherein both, the small-capacity reservoir 11 and the large-capacity reservoir 12 of the base station 1 are connected to the three-way-valve 50, the valve 50 is preferably designed to supply liquid only from the large-capacity reservoir 12 to the pump 10*a*.

Thereby, the valve 50 may be actuated automatically in the suitable position by the engagement/disengagement of the connection means 7*b* of the base station 1 into the water inlet connection 27 of the module.

The valve 50 may as well be designed to switch its supply position from the large-capacity reservoir 12 to the small-capacity reservoir 11 if no liquid can be drawn from the large-capacity reservoir 12, i.e. in case the reservoir 12 is empty.

Further, the valve means 50 may as well be designed to supply liquid drawn from the large-capacity reservoir 12 of the base station 1 at least partially to a leakage supply (not shown) provided between the valve means 50 and the reservoir 11 which enables liquid provision to the small-capacity reservoir 11 of the module 2, in case the small-capacity reservoir 11 is not full of liquid. Accordingly, in the docked state of the module 2, liquid may be provided from the large-capacity reservoir 12 of the base station 1 to the small-capacity reservoir 11 of the module 1 during the beverage preparation process. Hence, the small-capacity reservoir 11 may be automatically filled during beverage-preparation in the docked-state and does not need to be filled manually by the operator.

Figure 7A:
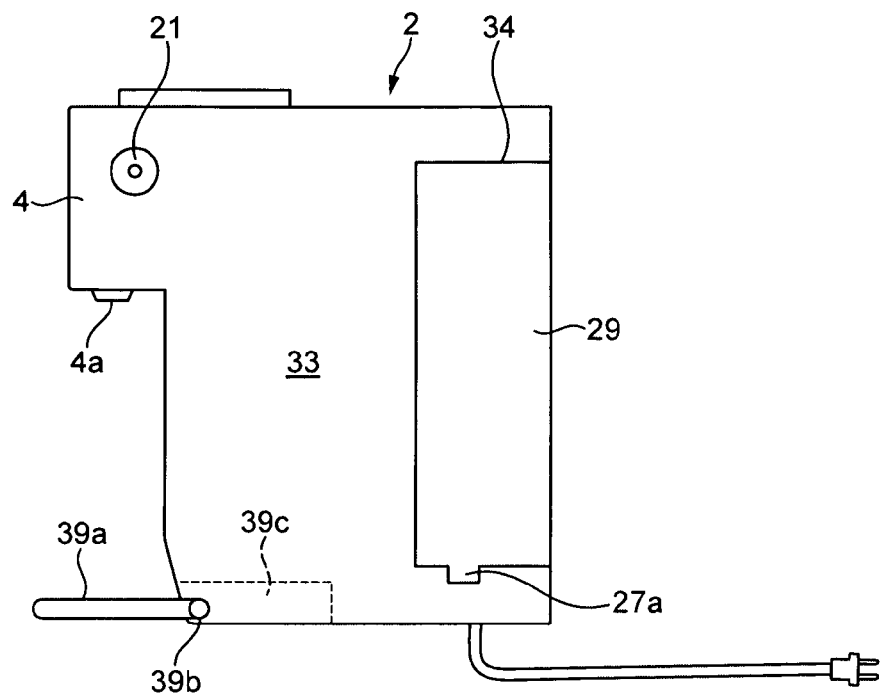
FIG. 7a shows a schematic drawing of another preferred embodiment of the beverage preparation module, whereby the module comprises a small reservoir placed in a rear recess of the module.

FIG. 7*a* shows a schematic drawing of another preferred embodiment of the beverage preparation module 2, whereby the low capacity liquid reservoir 29 is integrally connected to a recess 34 formed in the rear portion of the module 2. Thereby, the reservoir 29 is removably connected to the recess 34.

A compact arrangement of the module 2 is obtained as the recess 34 is equipped with water inlet connection means 27*a* which directly engage with the water outlet connection means 28 provided at a base portion of the reservoir 29.

Moreover, the drip tray 39*a* which is arranged below the extraction head 4 and liquid outlet 4*a* of the module 2 is preferably pivoted at a bottom portion of the body 33 of module 2 by means of a pivot 39*b*. Accordingly, the cup support 39*a* can be rotated about pivot 39*b* (e.g., in counter-clockwise direction) to assume a retracted position in which the drip tray 39*a* is stored in a dedicated recess 39*c* formed at the bottom portion of body 33. Accordingly, the footprint of the shown embodiment of the module 2 can be minimized for storing purposes. Before operation of the module 2 however, the drip tray 39*a* can be rotated about pivot 39*b* in order to assume its extended position as shown in FIG. 7*a*.

The drip tray according to the embodiment shown in FIG. 7*a* is preferably made of rigid plastic or aluminium.

Figure 7B:
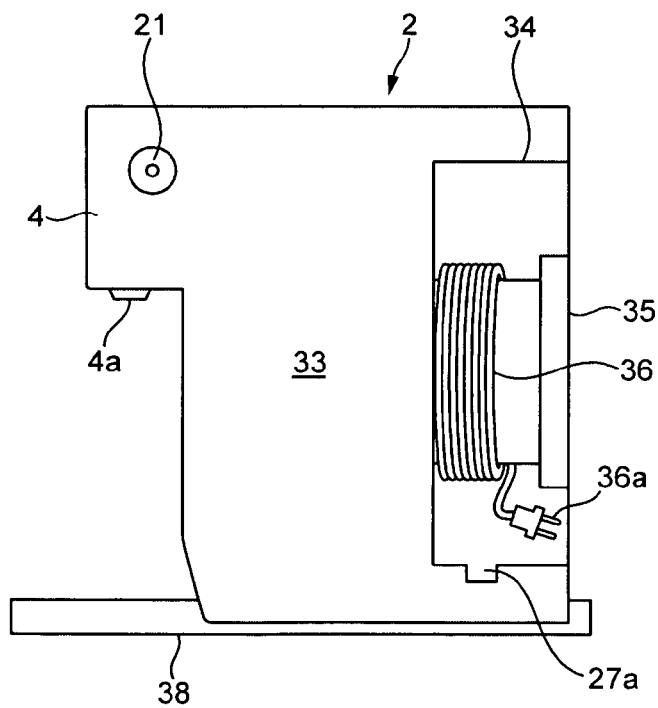
FIG. 7b shows a schematic drawing of the module according to FIG. 7a, wherein instead of a small reservoir, an extension conduit is disposed in the rear recess of the module.

As shown in an alternative embodiment according to FIG. 7*b*, instead of the low capacity reservoir 29 a support member 35 for an extension conduit 36 may be arranged within the rear recess 34 of the module 2. Thereby, the support member 35 is preferably a rolling device which preferably serves to roll up the extension conduit 36 in order to enable an efficient storing of the conduit within the recess 36. Instead of being rolled up, the tube-like extension conduit could as well be placed in the rear recess 34 which may be closed by a removable door.

The extension conduit 36 is preferably used for connecting an external liquid reservoir or an external liquid source to the water inlet connection means 27*a* of the module 2. Thereby, the extension conduit 36 preferably comprises at least one ending having a connector member 36*a* which can be selectively connected to the water inlet connection means 27 of the module 2.

Figure 7C:
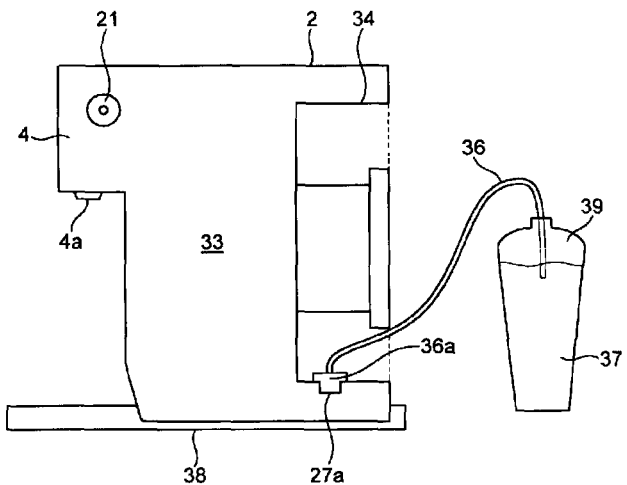
FIG. 7c shows the module according to FIG. 7b, wherein the extension conduit is used for connecting the module to an additional liquid reservoir.

For establishing a connection between the module 2 and an external liquid source 37 as for example a water bottle as shown in FIG. 7*c*, the extension conduit 36 is unrolled from the support member 35, the connector member 36*a* is connected to the water inlet connection means 27*a* of the module 2 and the other ending of the extension conduit 36 is dunked below the water line 39 of the external liquid reservoir 37. Accordingly, no dedicated liquid reservoir has to be present within the module 2 and hence, the portability and the independency of the module 2 is significantly enhanced, since any external liquid source 37 can be easily connected to the module 2 in order to prepare a beverage.

As shown in FIGS. 7*b* and 7*c*, a removable drip tray 38 may be provided to the bottom portion of the body 33 of the module 2. The drip tray 38 as shown in FIGS. 7*b* and 7*c* is preferably a rubber pad associated as a separate element below the module 2 when dispensing the beverage in the autonomous mode. The pad preferably has a few ridges and may be rinsed under fresh water after use. Accordingly, the footprint of the module 2 can be minimized and the movability and the storage properties of the module 2 are enhanced.

Figure 8:
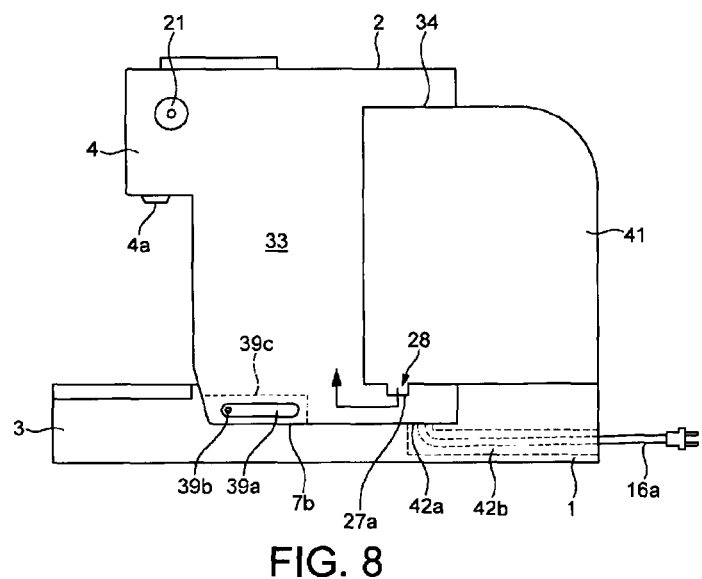
FIG. 8 shows another preferred embodiment of the system according to the present invention, wherein a large liquid reservoir supported by a base station is directly connected to the module according to the embodiments shown in FIG. 7a and FIGS. 7b and 7c respectively.

FIG. 8 shows another preferred embodiment of the system according to the present invention, wherein a large liquid reservoir 41 supported by the base station 1 is directly connected to the module 2 according to the embodiment shown in FIG. 7*a* and FIGS. 7*b* and 7*c* respectively. Thereby, the base station 1 basically corresponds to the base station as shown in FIGS. 1 and 3 respectively FIGS. 4 to 6.

As shown in FIG. 8, the module 2 may be connected to the base station 1 such that a liquid outlet connections means 28 of the large liquid reservoir 41 supported by the base station 1 directly engage with the liquid inlet connection means 27*a* of the module 2 which are situated in the rear recess 34 of the module 2. The large liquid reservoir 41 is partially supported by the module 2 and partially supported by the base station 1. Accordingly, a very compact and modular arrangement of the base station 1 and the module 2 can be obtained while at the same time the volume of the liquid reservoir 41 of the system is maximized.

In the connected state as shown in the figure, the rotatable drip tray 39*a* of the module 2 is in its retracted position and thus, housed by the recess 39*c*. Accordingly, the module 2 can be perfectly fitted onto the recess 7*b* of base station 1 and the drip tray 3 of the base station 1 can be used.

As shown in the figure, the electrical cable 16*a* of the module 2 may be guided through a provided hole 42*a* formed in the recess 7*b* of the base station 1 and a passage or groove 42*b* connected to the hole 42*a* to a rear portion of the base station 1.

Although the present invention has been described with reference to preferred embodiments thereof, many modifications and alternations may be made by a person having ordinary skill in the art without departing from the scope of this invention which is defined by the appended claims.

The invention claimed is:

1. A system for producing a beverage from portioned ingredients provided within a sealed capsule or pod, the system comprising:

a base station comprising a drip tray;

an autonomous beverage preparation module comprising an extraction head having a liquid outlet and being removably connectable to the base station, the extraction head being rotatably arranged with respect to a horizontal axis of a body of the autonomous beverage preparation module, the autonomous beverage preparation module and the base station respectively comprise matching positioning members which engage when the autonomous beverage preparation module is connected to the base station, and the positioning members are designed to position the autonomous beverage preparation module on the base station such that the drip tray of the base station is positioned vertically below the liquid outlet of the module.

2. A system according to claim 1, wherein the vertical position of the drip tray of the base station can be selectively adjusted.

3. A system according to claim 1, wherein the beverage preparation module comprises a cup support selectively connectable to a base portion of the module.

4. A system according to claim 1, wherein the beverage preparation module comprises a functional block including a water pump and water heater.

5. A system according to claim 4, wherein the base station comprises an additional liquid reservoir which is larger than the liquid reservoir of the beverage preparation module.

6. A system according to claim 1, wherein the system comprises a connector for establishing a liquid and/or electric connection between the beverage preparation module and the base station.

* * * * *